Oct. 7, 1969     E. L. CUSI     3,470,899
SELF-CLEANING GUIDE BUSHING
Filed Aug. 30, 1966     2 Sheets-Sheet 2

INVENTOR
EDUARDO L. CUSI
BY
Davis, Hoxie, Faithfull & Hapgood
ATTORNEYS

United States Patent Office 3,470,899
Patented Oct. 7, 1969

3,470,899
SELF CLEANING GUIDE BUSHING
Eduardo L. Cusi, Bethlehem, Pa., assignor to Sarco Company, Inc., Allentown, Pa., a corporation of New York
Filed Aug. 30, 1966, Ser. No. 576,061
Int. Cl. F16k *19/00, 25/00, 3/36*
U.S. Cl. 137—238                             9 Claims

---

ABSTRACT OF THE DISCLOSURE

A guide bushing for the valve stem of a pressure regulating valve or the like is made self-cleaning of dirt, scale, and other incrustations by diverting a portion of the fluid stream controlled by the valve through the clearance space between the bore of the bushing and the valve stem at high velocity.

---

Figure 1:
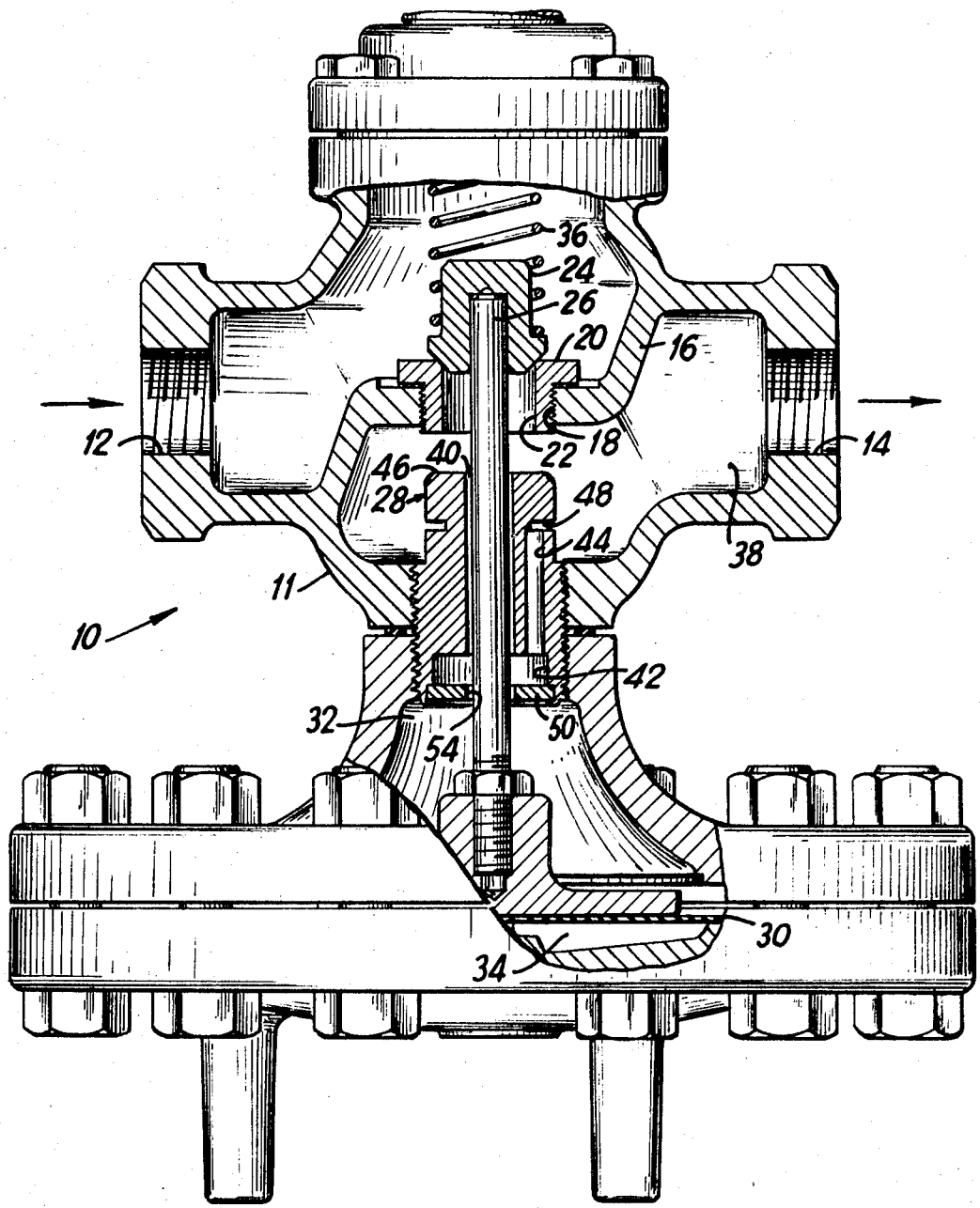

This invention relates to guide bushings and, more particularly, to guide bushings utilized in regulating valves wherein the bushings are exposed to the fluid being controlled.

One example of a valve in which such a guide bushing is used is a diaphragm valve of the type illustrated and described in United States Patent 3,103,232. In a diaphragm valve the valve stem is connected at one end to a sealing member such as a poppet valve and is connected at its other end to a flexible diaphragm which operates under the influence of differential pressures. The intermediate portion of the valve stem extends through a guide bushing which must be close fitting in order to assure proper alignment between the poppet valve and its seat. In valves of this type, operation of the poppet valve is controlled by the differential pressure across the diaphragm, the pressure on one side of the diaphragm being provided by a control means including a pilot valve. The control means senses the function being controlled, such as pressure, temperature, etc. and reflects required changes by means of a pressure variance on one side of the diaphragm. The pressure on the other side of the diaphragm is provided by the fluid which is the subject of control and which communicates with the diaphragm through a small aperture such as the clearance between the valve stem and its guide bushing. The flowing medium almost always contains foreign matter which has a great tendency to accumulate in the clearance between the stem and guide bushing resulting in, in addition to undue wear due to increased friction, inaccurate control response. The latter primarily is caused by two factors: the increased friction between the valve stem and its bushing and an obstructed orifice through which pressure communication between the flowing medium and the diaphragm is transmitted. Since the valve is calibrated considering a friction factor based upon a clean stem and bushing, scale buildup will result in inaccurate valve operation because an increase in friction necessitates a larger driving force on the diaphragm in order to operate the poppet valve. Therefore, a certain pressure differential across the diaphragm will effect different degrees of poppet valve movement depending upon the extent of said buildup. Furthermore, if the clearance between the stem and bushing is reduced due to scale formation, the pressure on one side of the diaphragm will not follow the fluid pressure fast enough resulting in a reaction delay. If the clearance between the stem and bushing is increased in order to retard accumulation of foreign matter, a cyclic or hunting action will ensue causing instability of valve operation.

Accordingly, it is one object of this invention to provide an improved valve guide bushing which is self-cleaning thereby improving valve performance and reducing valve maintenance.

Another object of this invention is to provide an improved guide bushing for use in a regulating valve which is self-cleaning and which promotes valve operation stability.

Figure 2:
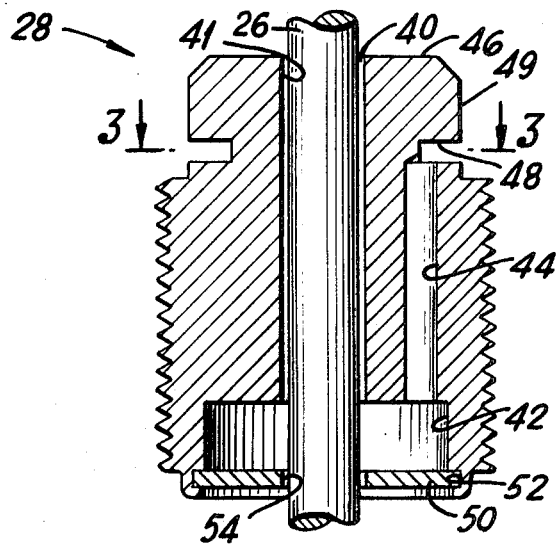
Figure 3:
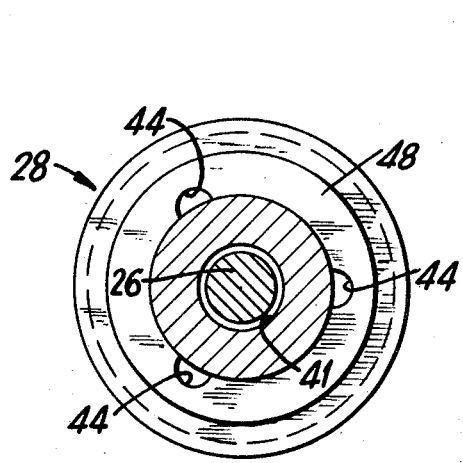
Figure 4:
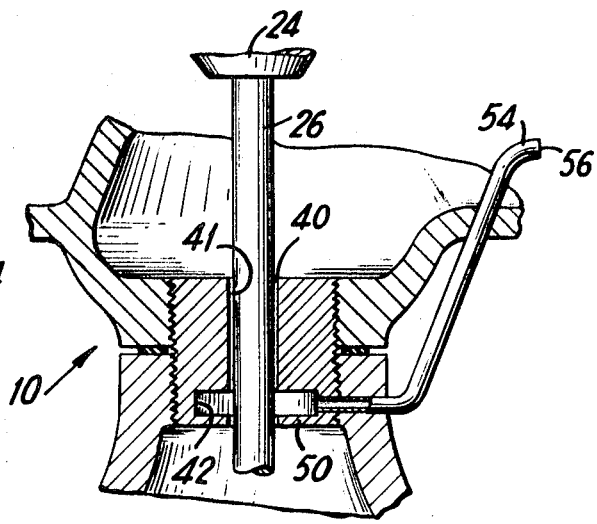

Further objects and attendant advantages of the present invention will become apparent from the following description taken in combination with the accompanying drawings in which:

FIGURE 1 is a sectional view of a regulating valve employing a guide bushing formed in accordance with one embodiment of the invention, FIGURE 2 is an enlarged sectional view of the guide bushing of FIGURE 1, FIGURE 3 is a sectional view taken along line 3—3 of FIGURE 2, and FIGURE 4 is a sectional view of a guide bushing formed in accordance with a second embodiment of this invention.

Briefly stated, this invention, in one form, provides a guide bushing for a regulating valve which induces a small portion of the fluid being controlled to flow at relatively high velocities through the clearance between the bushing and the valve stem. Such a flow is induced by providing a channel in the bushing having one end in flow communication with one end of the clearace and another end in flow communication with a source of reduced pressure. One such source of reduced pressure is the area along the side of the bushing immediately adjacent the end of the bushing against which the controlled fluid medium impinges as it passes through the orifice in the valve seat. The fluid medium is deflected from the bushing radially and passes by this area at a relatively high velocity thus causing a decrease in pressure in that locale. By means of the channel the low pressure is transmitted to one end of the clearance. The other end of the clearance is subjected to a higher pressure resulting from a relatively higher static pressure and a "ram" pressure caused by the fluid medium impinging upon the bushing surface at the point where the valve stem enters the bushing. This high pressure area effects a flow of fluid through the clearance from the high pressure area to the low pressure area. Because the pressure differential is substantial the velocity of the fluid flowing therethrough is high thereby maintaining the clearance free from accumulation of foreign matter by sweeping the clearance clean.

Adverting now to the drawings, and more particularly FIGURE 1, there is illustrated a regulating valve 10 of the type in which the subject guide bushing can be employed. It should be noted that regulating valve 10 is herein described for illustrative purposes only and depicts only one type of valve in which the guide bushing of this invention can be used. It is not intended to imply that the subject bushing has utility in such a valve only. The valve 10 basically comprises a housing 11 having an inlet 12 and an outlet 14 separated by an interposed partition 16 having an opening 18 therethrough. Mounted within the opening 18 is a valve seat 20 having an orifice 22 through which the fluid medium that is to be controlled flows from the inlet 12 to the outlet 14.

Control of the fluid medium is accomplished by a control valve such as a poppet valve 24 having a stem 26 which extends downwardly through the orifice 22 and a guide bushing 28, and is attached at its lower end to a flexible diaphragm 30. The guide bushing 28 is mounted in an inwardly flanged portion of the valve housing 11 so as to define, with the diaphragm 30 and housing 11, an upper diaphragm chamber 32 immediately above and communicating with the upper surface of the diaphragm. A lower diaphragm chamber 34 is provided below the diaphragm and the pressure within the lower chamber 34 is controlled or provided by any desirable means employed to control the flow of the fluid medium through the orifice 22, for example, a temperature control pilot valve (not shown). Pressure in the upper chamber 32 is maintained directly proportional to the pressure of the fluid in the outlet passage 38 by communication between the two through channels in the guide bushing 28 which are described below. A spring 36 urging the poppet valve 24 into a closed or seated position may be employed to augment the force acting on the valve stem 26 tending to seat the poppet valve 24.

In operation when a signal is received to increase the flow of the fluid medium the pressure in the lower diaphragm chamber 34 is increased and the resulting force on the diaphragm 30 exceeds the resisting force of the combined efforts of the spring 36 and the pressure in the upper chamber 32 thereby causing the diaphragm 30 to flex upwardly, unseating the poppet valve 24. The fluid medium then passes from the inlet 12, through the orifice 22 and out through the outlet passage 38 and outlet 14. This flow increases the pressure in the outlet passage 38 which is transmitted to the upper pressure chamber 32 and results in an adjustment of the poppet valve to produce the desired fluid flow level. It can be seen that the guide bushing 28 and, particularly the clearance 40 between the bushing and the valve stem 26, is exposed constantly to the fluid medium. The fluid medium almost always contains foreign matter and this matter will accumulate in the clearance. Any accumulation of foreign matter in the clearance 40 materially affects the operating life of the valve, increases the friction between the valve stem and the guide bushing thereby rendering it more difficult for the diaphragm 30 to open the poppet valve 24, and interferes with the efficient transmission of pressure from the outlet passage 38 to the upper pressure chamber 32.

To obviate these deficiencies the guide bearing 28 is provided with a self cleaning feature in order to insure removal of foreign material from the clearance 40. The improved guide bushing of this invention may be seen more clearly in FIGURES 2 and 3. The guide bushing 28 is provided with a central passageway 41 having a diameter slightly greater than the diameter of the valve stem 26 to be received within this passageway 41. The clearance 40 between the bushing 28 and the stem 26 must be maintained at a minimum in order to provide proper alignment between the poppet valve 24 and its seat 20; however, there must be sufficient clearance between the valve stem 26 and the bushing to permit reciprocation of the stem within the bushing without excessive rubbing friction or wear. An annular cavity 42 is provided adjacent the lower end of the bushing 28 which is in flow communication with the passageway 41 and with a plurality of relatively large channels 44 extending upwardly through the bushing 28 and which terminate adjacent the upper surface 46 of the bushing. An annular groove 48 extends radially inwardly from the outer side surface 49 of the bushing and intersects the channels 44 at their upper end thus providing flow communication between the annular groove 48 and the passageway 41 through the channels 44 and annular cavity 42.

A separator plate 50 is mounted within a counterbore 52 at the bottom of the guide bushing 28, and has a central orifice 54 with a diameter slightly greater than the valve stem 26 to permit relative movement of reciprocating the stem through the orifice 54. The fluid pressure in outlet passage 38 is transmitted to the upper diaphragm chamber 32 through the channels 44 and orifice 54. The clearance between the stem 26 and plate 50 is small enough to permit pressure sensing communication but prevent mass flow communication thereacross. The function of the separator plate 50 is to retard slightly the transmission of pressure through the bushing from the outlet passage 38 to the upper diaphragm chamber 32 and thereby prevent a cyclic or hunting action of the diaphragm 30 and poppet valve 24. If a liberal opening was permitted which would allow the pressure in the outlet passage to be instantaneously reflected in the upper diaphragm chamber 32 erratic valve operation would result as follows. A decrease in outlet pressure would result in a corresponding instantaneous decrease in pressure in the upper diaphragm chamber 32 causing the diaphragm to flex upwardly and unseat the poppet valve 24. Opening of the valve permits additional flow through the seat orifice 22 increasing the pressure in the outlet passage 38 which is instantaneously reflected in the upper diaphragm chamber 32 with a resulting tendency to close the poppet valve thereby establishing a cyclic or hunting action. The separator plate 50, by providing a minimum clearance between the plate and the valve stem and, consequently, a minimum channel through which pressure is transmitted, provides a sufficient delay in pressure transfer between the outlet passage 38 and the upper diaphragm chamber 32 to obviate this hunting action.

Referring back to FIGURE 1 it can be seen that when the poppet valve 24 is open the fluid medium flows through the orifice 22 and impinges upon the upper surface 46 of the guide bushing 28 at the location where the valve stem 26 enters the bushing 28 resulting in a deflection of the fluid medium radially outwardly at a relatively high velocity. The velocity vector parallel to the passageway 41 virtually is arrested resulting in the production of a "ram" pressure which exceeds the pressure in the outlet passage 38. Furthermore, rapid flow of fluid toward the outlet 14 past the side of the guide bushing results in a pressure depression in the area adjacent the bushing side. The radial annular groove 48 is located in the side of the bushing adjacent to the upper end thereof or, in other words, in the low pressure zone. The total effect of the ram pressure at the entrance to passageway 41 and decreased pressure at the exit of channel 44 is to provide a substantial pressure differential thereacross. Since the channels 44 and the annular cavity 42 are relatively large there is little pressure drop between the cavity 42 and the groove 48 and the low static pressure observed at the groove 48 is transmitted to the lower end of the passageway 41. This reduced pressure at the lower end of the passageway 41 induces a flow of the fluid medium through the clearance 40 between the valve stem 26 and the guide bushing 28. The fluid medium then passes outwardly through the channels 44 and groove 48 into the flow stream, cleaning the passageway and channels as it flows.

FIGURE 4 illustrates a second embodiment of this invention wherein a conduit 54 is employed in place of the flow channels 44 and groove 48 of the first embodiment discussed above. The conduit 54 communicates with an annular cavity 42 at the lower end of the guide bushing passageway 41. The remote end 56 of the conduit can be exposed to any suitable low pressure zone within the valve 10 or flow system or to an external low pressure source (not shown).

While FIGURES 2 and 3 illustrate a guide bushing having a flat upper surface 46 it is clear that other surface contours may be employed which serve to further increase the pressure differential across the cleaning passages.

As can be seen from above this invention provides a self cleaning guide bushing which improves the efficiency of operation of the valve and increases its operating life by preventing accumulation of foreign matter in the clearance between the guide bushing and valve stem.

What is claimed as new and desired to be secured by Letters Patent of the United States is:

1. For use with a regulating valve of the type having a conduit, the flow of fluid through the conduit being prescribed by a control valve having a stem extending from the conduit, an improved valve stem guide comprising a body having a first passageway therethrough, one end of which is exposed to the conduit, said first passageway slidably receiving the stem with clearance, and a second passageway, one end of said second passageway being in flow communication with a pressure source having a pressure less than that in the conduit, the other end of said second passageway being in flow communication with said first passageway adjacent to the other end thereof to effect flow of a portion of the fluid through said first passageway.

2. A valve stem guide as defined in claim 1 wherein the pressure source is external to the regulating valve.

3. A valve stem guide as defined in claim 1 wherein the fluid impinges upon said first end of said first passageway providing a ram pressure therein.

4. A valve stem guide as defined in claim 1 wherein said one end of said second passageway is in flow communication with a low pressure zone within the conduit.

5. A valve stem guide as defined in claim 1 wherein the regulating valve is of the type which includes an actuator having a pressure chamber, said guide including means to provide pressure sensing communication and obviate mass flow communication between the fluid conduit and the pressure chamber.

6. A valve stem guide as defined in claim 5 wherein said guide has a counterbore in the end thereof remote from the fluid conduit and circumscribing said first passageway and said means includes a plate mounted in said counterbore separating the pressure chamber from said first and second passageways, said plate having an aperture coaxial with said first passageway for slidably receiving the stem, said aperture cooperating with the valve stem to form therewith an orifice, said orifice having less area than the clearance between said first passageway and the valve stem to thereby provide pressure sensing communication between the pressure chamber and the fluid conduit via said second passageway.

7. A valve stem guide bushing as defined in claim 4 wherein said one end of said second passageway is aligned substantially parallel to and facing downstream of the direction of fluid flow to produce the low pressure zone.

8. A valve stem guide for use with a diaphragm type fluid regulating valve of the type having a valve housing provided with inlet and outlet passages with an interposed valve seat through which a fluid flows, and a control valve cooperating with said seat and having a valve stem extending therefrom and connected at its remote end to a diaphragm within a pressure chamber and responsive to differential pressures to effect operation of said control valve, said guide being interposed between the outlet passage and the diaphragm pressure chamber, said guide having a bore forming a first passageway communicating the outlet passage with the pressure chamber and slidably receiving the stem, such that fluid passing through the valve seat impinges upon a first end of said first passageway exposed to the outlet passage to effect an increase in pressure in said first passageway at said first end, said guide having a counterbore at the pressure chamber end thereof and a plate closing said counterbore to form therewith an annular cavity in communication with said first passageway, said plate separating said cavity from the diaphragm pressure chamber, a second passageway communicating the cavity with a low pressure zone in the outlet passage, the difference in fluid pressure between said first and second passageways effecting flow of a portion of the fluid through said first passageway into said cavity and out said second passageway into the outlet passage, said plate having an aperture coaxial with said first passageway for slidably receiving the valve stem with clearance between the stem and said plate, said clearance providing pressure sensing communication and obviating mass flow communication between the pressure chamber and the outlet passage via said second passageway.

9. A self-cleaning valve guide bushing comprising a body having a bore for receiving and guiding a valve stem, said bore extending through said body from an end exposed to the fluid stream controlled by the valve to an end remote from the stream, said bore being larger than the valve stem to provide a clearance space for flow of a portion of the fluid stream, a passage extending from said clearance space from a position near said remote end to a region of lower pressure than that available at said exposed end to thereby induce fluid to flow at high velocity through said clearance space to effect a cleaning action within said bore, and at said remote end of said bore a region of reduced clearance to discourage the induced flow from escaping from said remote end.

References Cited
UNITED STATES PATENTS

| | | | |
|---|---|---|---|
| 1,934,871 | 11/1933 | Moore | 251—119 |
| 2,305,975 | 12/1942 | McKinley | 251—119 X |
| 2,669,413 | 2/1954 | Hobbs | 251—119 |
| 2,890,713 | 6/1959 | Semon | 137—505.37 X |
| 3,103,232 | 9/1963 | Ritter | 137—505.37 |

CLARENCE R. GORDON, Primary Examiner

U.S. Cl. X.R.

137—505.37; 251—119